United States Patent [19]

Wagensonner et al.

[11] 4,096,491
[45] Jun. 20, 1978

[54] PHOTOGRAPHIC CAMERA WITH AN AUTOMATIC EXPOSURE-CONTROL CIRCUIT INTO WHICH ONE OF TWO DIFFERENT LIGHT-SENSITIVE ELEMENTS IS SWITCHED DEPENDING UPON SCENE BRIGHTNESS

[75] Inventors: Eduard Wagensonner, Aschheim; Peter Lermann, Narring; Günter Fauth, Unterhaching, all of Germany

[73] Assignee: AGFA-Gevaert AG, Leverkusen, Germany

[21] Appl. No.: 775,985

[22] Filed: Mar. 9, 1977

[51] Int. Cl.² .............................................. G03B 7/08
[52] U.S. Cl. ......................................... 354/31; 354/51
[58] Field of Search .................... 354/31, 50, 51, 60 R

[56] References Cited

U.S. PATENT DOCUMENTS 4,021,822   5/1977   Tsujimoto et al. ..................... 354/31

*Primary Examiner*—L. T. Hix
*Assistant Examiner*—M. L. Gellner
*Attorney, Agent, or Firm*—Michael J. Striker

[57] ABSTRACT

The camera has a shutter release, a shutter, a device responsive to activation of the release for performing a retarded opening of the shutter, and a device operative when activated for causing the shutter to close. The exposure duration is controlled by an exposure control circuit. When the scene brightness level is within a first range, the automatically selected exposure durations are so short that, during a substantial part of the exposure, the shutter is in the process of changing from its closed to its fully open state. When the scene brightness level is within a second range, the automatically selected exposure durations are so long that, during a substantial part of the exposure, the shutter will already be in its fully open state. The exposure control circuit includes first and second light-sensitive elements, used alternatively for scene brightness levels in the first and second ranges, respectively, and first and second electronic switches connected in the current paths of the respective light-sensitive elements for switching one or the other light-sensitive elements into the exposure control circuit. A master-slave flip-flop has an information-signal input, two mutually complementary outputs and a clock input. The two controllable electronic switches have control inputs connected to respective ones of the flip-flop outputs. A brightness-measuring circuit determines whether the scene brightness level is in the first or the second range, and correspondingly applies to the information-signal input of the flip-flop one or the other of two information signals.

7 Claims, 1 Drawing Figure

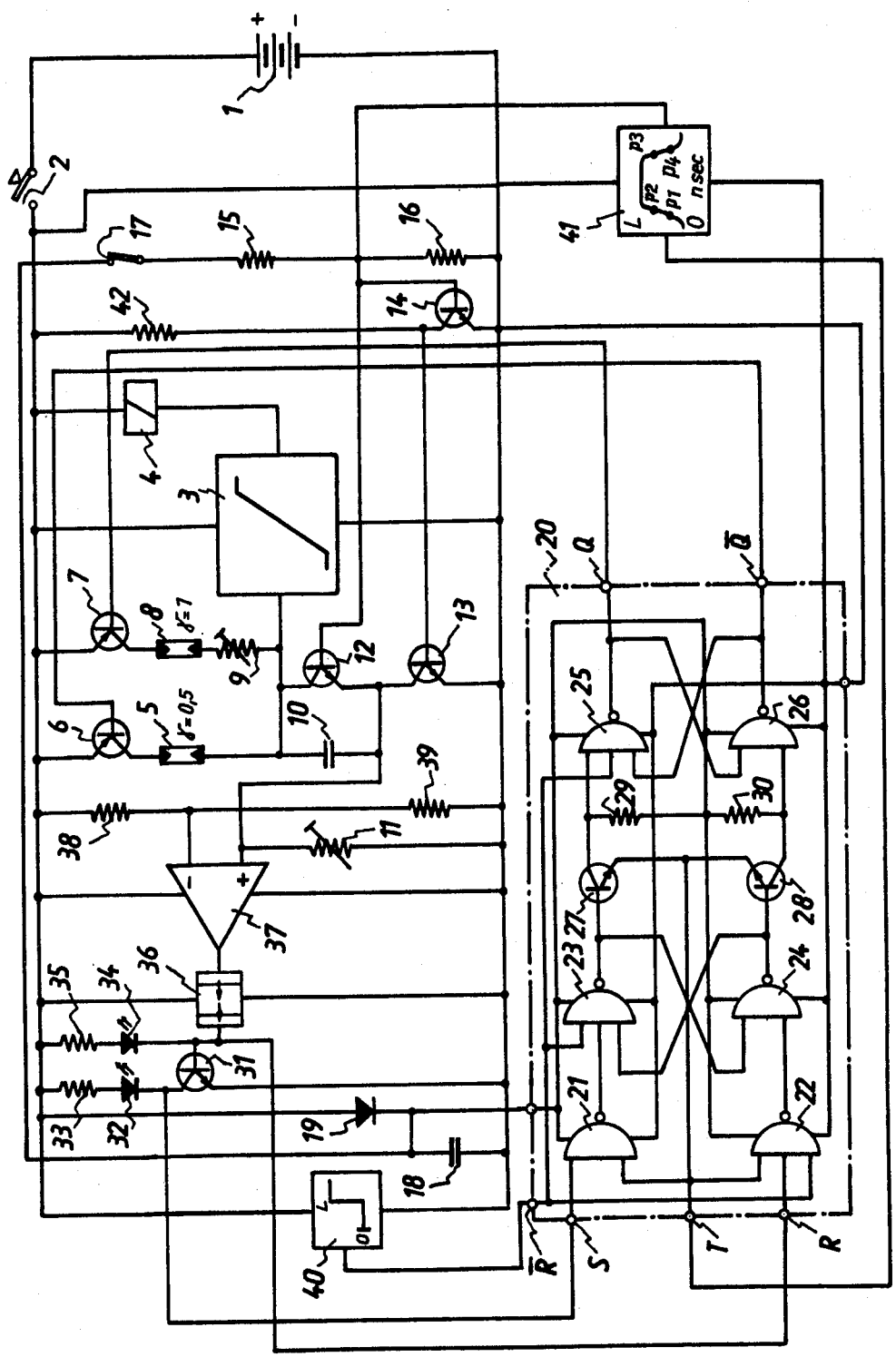

PHOTOGRAPHIC CAMERA WITH AN AUTOMATIC EXPOSURE-CONTROL CIRCUIT INTO WHICH ONE OF TWO DIFFERENT LIGHT-SENSITIVE ELEMENTS IS SWITCHED DEPENDING UPON SCENE BRIGHTNESS

BACKGROUND OF THE INVENTION

The present invention relates to photographic cameras of the type provided with a shutter release, a shutter, means responding to activation of the shutter release by causing the shutter to perform a retarded opening movement, and means operative when activated for causing the shutter to close, to thereby terminate the exposure. Cameras of the type in question are also provided with automatic exposure-control circuitry operative for selective exposure durations in dependence upon scene brightness levels.

When the scene brightness level is within a first range, the automatically selected exposure durations will be so short that, during a substantial part of the exposure, the shutter will be in the process of moving from its closed to its open position.

When the scene brightness level is within a second range, the automatically selected exposure durations will be so long that, during a substantial part of the exposure, the shutter will already be in its fully open setting.

If the light-integrating circuit of the automatic exposure control means incorporates only a single light-sensitive element to be used for scene brightness levels within both the first and the second range, there may be difficulty in providing a single light-sensitive element whose sensitivity is appropriate for the brightness levels of the two brightness ranges.

It would be desirable to alternatively use for the light-integrating circuit two different light-sensitive elements, one having a sensitivity appropriate for the one range, the other having a sensitivity appropriate for the other range. However, if this is to be done, then problems arise as to how the correct one of the two light-sensitive elements is to be switched into the light-integrating circuit, if the switching-in is to be effected automatically.

SUMMARY OF THE INVENTION

It is a general object of the invention to provide an exposure-control circuit incorporating two light-sensitive elements, respectively adapted for scene brightness levels in two different ranges, and utilized alternatively, with the switching in of one or the other of the elements into the exposure-control circuit being performed automatically in dependence upon the scene brightness level.

It is a further object to utilize entirely electronic switching means for switching the appropriate light-sensitive element into and out of the exposure-control circuit.

It is another object to provide an exposure-control circuit in which the switching-in of the appropriate light-sensitive element occurs prior to the initiation of the actual exposure-duration timing operation.

Another object of the invention is to utilize one of the two light-sensitive elements for the determination of which light-sensitive element should be switched into the exposure-control circuit, but in such a way that the illumination incident upon the two light-sensitive elements during the subsequent exposure-control operation does not interfere with the earlier automatic decision as to which light-sensitive element is to be used for exposure control.

It is also an object to provide an exposure-control circuit whose configuration is inherently capable of realization in integrated-circuit form and inherently requires little space within the camera in which it is employed.

These objects, and others which will become more understandable from the description of a preferred embodiment, can be met, according to one advantageous concept of the invention, by utilizing two controllable electronic switches, each connected in the current path of a respective one of the two light-sensitive elements. These two switches each have a control input connected to a respective one of the mutually complementary outputs of a bistable circuit. Accordingly, the two switches are alternatively conductive. When one switch is conductive, the associated light-sensitive element is switched into the exposure-control circuit, whereas the other switch, being non-conductive, causes the associated light-sensitive element to be switched out of the circuit. The bistable circuit has an information-signal input, a clock input, and gating means operative for keeping the signals at the complementary outputs independent of signals applied to the information-signal input, except in response to the application of a clock pulse to the clock input. A brightness-measuring circuit is operative for determining whether the scene brightness level is within the first or the second range, and correspondingly applies to the information-signal input of the bistable circuit one or the other of two information signals. The brightness-measuring circuit includes setting means operative for switching into the brightness-measuring circuit a predetermined one of the two light-sensitive elements; this is accomplished by setting the bistable circuit to a predetermined one of its two states irrespective of the signal applied to its information-signal input. Thus, the preliminary brightness level measurement, needed to determine which light-sensitive element should be used for the exposure-control operation, is itself always performed utilizing only a predetermined one of the two light-sensitive elements. A clocking circuit is operative, after completion of the preliminary brightness-measuring operation, for applying a brief clock pulse to the clock input of the bistable circuit, thereby briefly enabling the gating means of the latter. As a result, the output signals of the bistable circuit become dependent upon the information signal applied to the information-signal input by the brightness-measuring circuit. Thus, the state of the bistable circuit will be such as to cause the proper one of the two light-sensitive elements to be switched into the exposure-control circuit, and the exposure-control circuit is ready to perform a timing operation.

It is preferred to use always a predetermined one of the two light-sensitive elements for the initial determination of which element to use for the exposure-timing operation, irrespective of what the scene brightness level may be.

The clock pulse enables the gating means of the bistable circuit, to establish a control connection between the inputs and outputs of the circuit. During the existence of the clock pulse, the signal applied to the information-signal input of the bistable circuit is transmitted to the associated one of the two complementary outputs, either logically inverted or not logically inverted. After the end of the clock pulse, changes in the value of the signal applied to the information-signal input of the bistable circuit have no effect upon the signals at the complementary outputs.

According to another concept of the invention, the bistable circuit has the form of an RS master-slave flip-flop having two information-signal inputs. The brightness-measuring circuit includes an inverter stage, so that it can furnish both an information-signal indicative of which light range is involved, as well as the logical complement of that information signal, to respective ones of the two information-signal inputs of the master-slave flip-flop. The brightness-measuring circuit is comprised of a digital brightness measuring stage, for example comprised of a operational-amplifier comparator. Advantageously, the brightness-measuring circuit includes a time-delay stage, for introducing a delay into the application of the information signals to the two information-signal inputs of the flip-flop. The purpose of this time delay is to ensure that changes in these information signals which may occur as the automatically selected light-sensitive element is being switched into the exposure-control circuit, cannot be transmitted to the information-signal inputs of the flip-flop, until after the termination of the clock pulse.

According to a preferred concept of the invention, the digital brightness-measuring circuit is comprised of a digital differential amplifier, preferably of the operational-amplifier type. One input of the differential amplifier is connected to the tap of a fixed-resistor (light-independent) voltage divider. Its other input is connected to the tap of a voltage divider comprised of the predetermined one of the light-sensitive elements (the one used for preliminary brightness level measurement) and a series resistor. The resistance value of the series resistor is so selected, relative to the sensitivity characteristics of the cooperating light-sensitive element, that the output signal of the differential amplifier will change from one to the other of its two values when the scene brightness level changes from one of the two ranges to the other. This assures that the inverting input of the differential amplifier, during the preliminary brightness level determination, will have a signal whose value ("0" or "1" ) is coordinated with the prevailing scene brightness range.

When the brightness-measuring circuit senses a scene brightness level calling for an exposure duration greater than the time required for the aperture-unblocking member of the shutter to move from its blocking to its unblocking position, then the brightness-measuring circuit causes the bistable circuit to switch the first light-sensitive element into the exposure-control circuit, and the second light-sensitive element to be switched out. However, the actual switch-in of the appropriate light-sensitive element, indicated by the signals which the brightness-measuring circuit applies to the information-signal inputs of the bistable circuit, does not occur until the latter receives the clock pulse.

According to another concept of the invention, the time-delay interval introduced by the delay stage in the brightness measuring circuit, considered relative to the moment at which the transition from the preliminary brightness measurement to the actual switch-in of the appropriate light-sensitive element occurs, is greater than the duration of the clock pulse. The duration of the clock pulse may be on the order of nanoseconds or microseconds. This is done to prevent the brightness-measuring circuit from interfering with or confusing the switch-in of the automatically selected light-sensitive element, which is a danger particularly to be considered when the element used for the preliminary assessment of scene brightness is not the element to be used for the actual exposure control operation. For example, if the first light-sensitive element is used to assess scene brightness, and if the scene brightness is determined to be in the second range, the brightness-measuring circuit applies to the bistable circuit information signals instructing the bistable circuit to select the second light-sensitive element for use in the exposure-control operation. However, as the second light-sensitive element is then switched into the exposure-control circuit, it will incidentally be switched into the brightness-measuring circuit as well, in one embodiment of the invention. As a result, the brightness-measuring circuit will receive a different brightness-dependent input voltage and may, as a result, apply to the bistable circuit information signals commanding the selection of the first light-sensitive element, just as the second element is in the process of being switched in. The aforementioned time delay relative to the clock pulse duration prevents this from occurring.

According to another concept of the invention, the bistable circuit has positive and negative internal operating-voltage lines. One line is connected to one terminal of the camera battery. The other line is connected to the other battery terminal via a diode, and a storage capacitor is connected across the two lines. The diode serves to decouple the bistable circuit from other circuit stages.

According to a preferred concept of the invention, the preliminary brightness-measurement operation always employs the same one of the two light-sensitive elements because, in response to shutter release activation, a setting circuit applies a setting pulse to the bistable circuit, causing it to assume a predetermined one of its two states, regardless of the information signals which it is receiving from the brightness-measuring circuit. Advantageously, this setting circuit is provided with an inverter and a time-delay stage of its own, with the time-delay interval being smaller than the aforementioned time-delay provided in the brightness-measuring circuit.

To smoothly match the sensitivity characteristics of the light-sensitive elements associated with the two scene brightness ranges to each other, a resistor can be provided in the current path of the second light-sensitive element. The resistance of that resistor will be so selected that the sensitivity curve of one element merges tangentially into the sensitivity curve of the other element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE depicts one exemplary embodiment of the invention.

DESCRIPTION OF THE PREFERRED EMBODIMENTS

The non-illustrated camera has a shutter release, a shutter, means operative in response to shutter release activation for causing the shutter to perform a retarded opening, and means operative when activated for causing the shutter to close substantially instantaneously, to terminate the exposure.

The camera includes an exposure-control circuit, depicted in the FIGURE. When the scene brightness level is within a first range, the automatically selected duration of the exposure will be so short that, during a substantial fraction of the exposure time interval, the shutter will be in the process of opening. In contrast, when the scene brightness level is within a second range, the automatically selected duration of the exposure will be so long that, during a substantial fraction of the exposure time interval, the shutter will already be in its fully open setting, i.e., in its maximum-opening setting or in the maximum setting thereof corresponding to the detected scene brightness level.

The configuration of the circuit depicted in the FIGURE is discussed as follows:

A battery 1 is connectable to the illustrated circuitry by means of a switch 2 coupled to the shutter release of the camera. Connected across the battery terminals is a threshold circuit, for example a Schmitt trigger, in whose output circuit is connected an electromagnet 4 for activating the closing means of the (non-illustrated) shutter mechanism.

Numeral 5 denotes the first of two photoresistors, having here a gamma value of 0.5. This photoresistor 5 is to be used in the exposure-control circuit when the scene brightness level requires an exposure duration so short that, during a substantial fraction of the exposure time interval, the aperture-unblocking member of the shutter mechanism is still in the process of opening. Connected in series with photoresistor 5 is a switching transistor 6. Connected in parallel to photoresistor 5 and transistor 6 is the series combination of a further photoresistor 8, further switching transistor 7, and an adjustable resistor 9. Photoresistor 8 has a gamma value of unity. It is to be used in the exposure-control circuit when the scene brightness level requires an exposure duration so long that, during a substantial fraction of the exposure time interval, the shutter mechanism will already be in its open setting, i.e., the fully open setting or the maximum setting corresponding to the prevailing brightness level; once the shutter has reached this setting, it remains at this setting for the remainder of the exposure.

The parallel photoresistor branches are connected in series with an integrating capacitor 10 and an indicator resistor 11. Connected in parallel to integrating capacitor 10 is a transistor 12. Connected in parallel to indicator resistor 11 is a transistor 13. The base of transistor 13 is connected to the collector of an inverting transistor 14, whose base is connected to the tap of a voltage divider 15, 16. The tap of voltage divider 15, 16 is also connected directly to the base of transistor 12. Connected in the current path of the two voltage-divider resistors 15, 16 is a switch 17. Switch 17 is normally closed, but opens during depression of the shutter release button of the camera. When switch 17 opens, the transition from the initial scene brightness measurement operation to the actual exposure operation occurs, in a manner described below. Switch 17 serves as a start switch for the light-integrating circuit 5, 10 or 8, 10. One terminal of switch 17 is connected to the junction between a storage capacitor 18 and a diode 19.

Numeral 20 denotes an RS master-slave flip-flop, having two internal operating voltage supply lines. One of these lines is connected to the upper electrode of capacitor 18 and the cathode of diode 19, and thus via diode 19 to the positive battery terminal. The other of these internal operating voltage supply lines is directly connected to the negative battery terminal.

RS master-slave flip-flop 20 is comprised of six NAND-gates 21-26 and two control transistors 27 and 28 provided with collector resistors 29 and 30. A first output Q of the flip-flop is connected to the base of switching transistor 7; the other flip-flop output $\overline{Q}$ is connected to the base of switching transistor 6. The flip-flop outputs Q, $\overline{Q}$ are mutually complementary; i.e., when the signal at one is "1", the signal at the other is "0", and vice versa.

The flip-flop 20 has first and second information-signal inputs R and S. Information-signal input S is connected to the collector of a transistor 31, in whose collector circuit is provided a light-emitting diode 32 and a series resistor 33. The second information-signal input R is connected to the base of transistor 31. Transistor 31 serves as an inverter. Accordingly, if a "0" signal is applied to input R from the base of transistor 31, a "1" signal will be applied to S from the collector of transistor 31, and vice versa. In other words, the information-signal inputs R, S of flip-flop 20 always receive complementary information signals from transistor 31. A further light-emitting diode 34 and series resistor 35 are connected in the base circuit of transistor 31.

The base of transistor 31 is connected to the output of a time-delay stage 36, whose input is connected to the output of an operational amplifier 37. The inverting input of operational amplifier 37 is connected to the tap of a voltage divider 38, 39. The non-inverting input of operational amplifier 37 is connected to the junction between the indicator resistor 11 and the integrating capacitor 10.

Numeral 40 denotes a set pulse stage, whose output is connected with a set input $\overline{R}$ of the master-slave flip-flop. The set pulse stage includes a (non-illustrated) inverter stage and a (non-illustrated) time-delay stage. When the shutter release button is depressed and switch 2 closes, operating voltage is applied to the set pulse stage 40. The "0" output signal of this stage does not immediately change to "1", but does so after the elapse of the time-delay interval established by its internal time-delay stage. The time-delay interval of set pulse stage 40 is longer than that of the time-delay stage 36 referred to above.

The RS master-slave flip-flop 20 is essentially comprised of an input NAND-gate stage 21, 22, a master flip-flop 23, 24, a gating stage 27, 28, 29, 30, and a slave flip-flop 25, 26. Additionally, the RS master-slave flip-flop 20 is provided with a clock input T. In general, the information signals applied to information-signal inputs R,S are not transmitted through the input NAND-gate stage 21, 22 to the master flip-flop 23, 24, and are not transmitted from the master flip-flop 23, 24 through the gating stage 27-30 to the slave flip-flop 25, 26, except when a clock pulse is applied to the clock input T. Clock input T is connected to the output of a clocking stage 41, whose input is connected to the tap of voltage divider 15, 16. The operating voltage terminals of the clocking stage 41 are connected across the battery 1.

The operation of the illustrated circuit will now be explained.

For the sake of an overview, the circuit operation can be broken down into three phases: the brightness-measurement operation, the transitional phase, and the exposure-control operation.

During the brightness-measurement phase, photoresistor 8 is utilized to determine whether the prevailing scene brightness is in the first or the second range, and information signals indicative of the detected range are applied to flip-flop 20, but cannot change the state of the flip-flop.

During the transitional phase, the information signals applied to flip-flop 20 can cause the flip-flop to change state, causing the photoresistor appropriate for the detected brightness range to be switched into the exposure-control circuit.

During the exposure-control operation, the exposure duration is automatically controlled by light-integrating action, utilizing the one of the two photoresistors indicated by the information signals mentioned above.

The detailed explanation of the circuit operation is as follows:

Let it be assumed that the prevailing scene brightness level falls within the brightness range requiring an exposure duration so short that, during at least a substantial fraction of the exposure time interval, the aperture-unblocking member of the (non-illustrated) shutter mechanism will be in the process of moving from the blocking position to the unblocking position.

The shutter release button is depressed by the user of the camera. In response to the initial part of such depression, switch 2 closes, thereby connecting the circuit to the battery 1.

In response to closing of switch 2, set pulse stage 40 applies a set pulse to input $\overline{R}$ of master-slave flip-flop 20. Set pulse stage 40 does not apply this set pulse in immediate response to closing of switch 2, but only after a predetermined time delay established by an internal time-delay stage.

The set pulse applied by stage 40 of flip-flop input $\overline{R}$ causes the flip-flop 20 to assume its first state, wherein the value of the signal at output Q is "1" and the value of the signal at output $\overline{Q}$ is "0". This state is assumed independently of the signals being applied to information-signals R, S, because during this phase of operation, the flip-flop 20 is not responsive to the signals at R and S.

In this first state of flip-flop 20, the "1" signal at Q renders transistor 7 conductive, and the "0" signal at $\overline{Q}$ renders transistor 6 non-conductive. As a result, photoresistor 8 is switched into the brightness-measuring circuit, whereas photoresistor 5 is switched out of the brightness-measuring circuit.

The brightness-measuring circuit is comprised of components 8, 11 and 31–39. Transistor 12 is conductive, because its base is connected to the tap of voltage divider 15, 16. Accordingly, integrating capacitor 10 is short-circuited. Transistor 13 is non-conductive, because its base is connected to the collector of inverting transistor 14. Accordingly, indicator resistor 11 is not short-circuited.

Photoresistor 8 and indicator resistor 11 together form a light-dependent voltage divider whose tap is connected to the non-inverting input of comparator 37. Depending upon which of the two comparator input voltages is the greater, the comparator output signal will be "1" or "0". For the scene brightness range assumed above, the comparator output signal will be "1".

This comparator output "1" signal is applied to the base of inverting transistor 31 via the time-delay stage 36. The high ("1") voltage at the base of transistor 31 prevents LED 34 from lighting up. However, this base voltage renders transistor 31 conductive, so that its low collector voltage permits LED 32 to light up. The illumination of LED 32 indicates to the user that the exposure duration will be such as to permit hand-held operation of the camera.

The "1" signal at the base of transistor 31 and the "0" signal at its collector are respectively applied to information signal inputs R and S of flip-flop 20. These complementary information signals indicate which brightness range has been ascertained, and thereby indicate which of photoresistors 5, 8 is to be switched into the exposure-control circuit. However, the flip-flop 20, although it receives these information signals, remains in its first state.

The user of the camera now depresses the shutter release button further. As a result, switch 17 opens. Also, the shutter-opening means of the camera causes the shutter to commence its opening movement.

When switch 17 thusly opens, the tap of voltage divider 15, 16 no longer furnishes the base of transistor 12 with a positive voltage, and transistor 12 becomes non-conductive. As a result, integrating capacitor 10 is no longer short-circuited. Likewise, inverting transistor 14 becomes non-conductive, and renders transistor 13 conductive, thereby short-circuiting the indicator resistor 11.

The drop in the potential at the tap of voltage divider 15, 16, resulting from the opening of switch 17, is transmitted to clocking stage 41, triggering the latter. When thusly triggered, clocking stage 41 generates a clock pulse, graphically depicted within the circuit block 41 of the FIGURE. This clock pulse has a duration on the order of nanoseconds or microseconds, and has leading and trailing flanks. The clock pulse is applied to clock input T of flip-flop 20.

The effect of the clock pulse upon the flip-flop 20 is as follows:

At moment P1, the hitherto conductive transistors 27, 28 of the gating stage 27–30 are rendered non-conductive.

At moment P2, the information signals applied to flip-flop inputs S, R are transmitted through NAND-gate input stage 21, 22 to master flip-flop 23, 24 and registered by the latter. They are not yet transmitted from master flip-flop 23, 24 to slave flip-flop 25, 26, because gating stage 27–30 has been disabled, starting at moment P1, just mentioned.

At moment P3, input NAND-gate stage 21, 22 is disabled, and thereby rendered unresponsive to any subsequent changes in the information signals applied to R and S, if such changes should occur.

At moment P4, gating stage 27–30 is reenabled, and the information signals registered by master flip-flop 23, 24 are transmitted to slave flip-flop 25, 26. As a result, the signal on output $\overline{Q}$ changes from "1" to "0", and the signal on output Q changes from "0" to "1". I.e., the flip-flop 20 changes from its first state to its second state.

When the flip-flop 20 thusly changes from its first state to its second state, switching transistor 7 is rendered non-conductive, and switching transistor 6 is rendered conductive, thereby switching photoresistor 5 into both the brightness-measuring circuit 5, 31–39 and the exposure-control circuit 5, 10, 3, 4.

It is to be understood that this switching of photoresistor 5 into the exposure-control circuit 5, 10, 3, 4 is the object of the operation just performed. The switching of photoresistor 5 into the brightness-measuring circuit 5, 31-39 is incidental.

However, this incidental switching of photoresistor 5 into the brightness-measuring circuit 5, 31-39 can create problems, if countermeasures are not taken. Although the scene brightness level has not changed, the change of photoresistor causes the output signal of comparator 37 to drop from "1" to "0". It is to be understood that the circuit operations just enumerated occur almost instantaneously. Therefore, the change in the comparator output signal from "1" to "0" could, in principle, countermand the photoresistor selection just accomplished. This would happen because the change in the comparator output signal is transmitted, via transistor 31, of the information-signal inputs R, S of flip-flop 20.

This difficulty is avoided by providing the time-delay stage 36. The change in the comparator output voltage attributable to the mere switchover from one photoresistor to the other does become transmitted to the information-signal inputs of flip-flop 20, but after a time-delay interval long enough to ensure that flip-flop 20 will not receive the changed information signals until after the termination of the clock pulse. After termination of the clock pulse, the change in the information signals applied to S and R have no effect upon the signals at Q and $\overline{Q}$.

The exposure-control operation commences virtually immediately. Integrating capacitor 10 is charged by light-dependent current flowing through photoresistor 5. The voltage across integrating capacitor 10 is applied to the input of threshold circuit 10. When the threshold voltage of circuit 10 is reached, indicating sufficient exposure, circuit 10 energizes (or deenergizes) electromagnet 4, causing the shutter to close almost instaneously.

The adjustable resistor 9 is provided for varying the resistance of branch 7, 8, 9 in such a manner that the sensitivity curve of the one photoresistor merges tangentially into that of the other photoresistor. However, it would be possible to dispense with the adjustable resistor, in which case there would be a knee in the compound sensitivity curve of the two photoresistors.

In the operating example described above, flip-flop 20 was kept in its first state (Q = 1, $\overline{Q}$ = 0) during the preliminary scene-brightness measurement. This was done to ensure that photoresistor 8 was utilized for the preliminary scene-brightness measurement. Then, because the scene brightness level was ascertained as being in the brightness range requiring the switching of photoresistor 5 into the exposure-control circuit, the flip-flop underwent a transition into its second state (Q = 0, $\overline{Q}$ = 1). Of course, if the other brightness range were involved, then, in response to the clock pulse applied to T, the flip-flop 20 would have merely remained in its first state (Q = 1, $\overline{Q}$ = 0), because the photoresistor 8 required for the exposure-control operation would already be switched into the exposure-control circuit.

In the embodiment described above, reference has been made to the operation of the shutter. As indicated above, for long exposures, the shutter will already be in its fully open position during a substantial portion of the exposure. This fully open position may correspond to the largest-aperture position which the shutter can assume. Alternatively, in cameras where the largest-aperture position which the shutter can assume is preset manually, or set automatically in dependence upon scene light, then the fully open position is to be understood to be the thusly established largest-aperture setting of the shutter.

In the embodiment described above, the preliminary brightness level assessment is performed and completed, and the appropriate light-sensitive element switched into the light-integrating circuit, prior to the start of the exposure proper. Alternatively, this could in principle be done at the start of the exposure, since the time required for the electronic circuitry to perform the preliminary brightness measurement and subsequent light-sensitive element selection is negligible.

Also, in the embodiment described above, for the first scene brightness range only the first light-sensitive element is used, and for the second scene brightness range only the second light-sensitive element is used, during the actual exposure-control operation. In principle it would be possible, for example, to use the first element during the first part of the exposure and the second part of exposure, for the second scene brightness range, and to use only the first element for the entire exposure for the first scene brightness range.

Likewise, it is to be understood that each light-sensitive element could be comprised of a plurality of photoresistors, for example. In that event, in principle, the photoresistors constituting the first element might overlap with the photoresistors constituting the second element; for example, the first element might be comprised of two photoresistors used jointly, and the second element of one of the two photoresistors used alone.

It will be understood that each of the elements described above, or two or more together, may also find a useful application in other types of circuits and constructions differing from the types described above.

While the invention has been illustrated and described as embodied in a photographic camera wherein the two scene brightness ranges involved have been discussed with respect to the operation of a particular type of shutter mechanism action, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera of the type provided with a shutter release, a shutter, means responsive to the activation of the release for performing a retarded opening of the shutter and means operative when activated for causing the shutter to close, in combination, exposure control means operative when the scene brightness level is within a first range for automatically selecting exposure durations so short that during a substantial part of the exposure the shutter is in the process of opening, and operative when the scene brightness level is within a second range for automatically selecting exposure durations so long that during a substantial part of the exposure the shutter will already be in the fully open setting thereof, the exposure control means comprising a light-integrating circuit including first and second light-sensitive elements to be used alternatively for scene brightness levels in respective ones of the brightness ranges, and first and second controllable electronic switches connected to the respective light-sensitive elements for switching one or the other of the light-sensitive elements into the light-integrating circuit; a bistable circuit provided with at least one information-signal input, two mutually complementary outputs, a clock input, and gating means operative for keeping the signals at the complementary outputs independent of signals applied to the information-signal input except in response to the application of a clock pulse to the clock input, the two controllable electronic switches each having a control input connected to a respective one of the complementary outputs of the bistable circuit; a brightness-measuring circuit operative for determining whether the scene brightness level is within the first or the second range and correspondingly applying to the information-signal input of the bistable circuit one or the other of two information signals, the brightness-measuring circuit including setting means operative for switching into the brightness-measuring circuit a predetermined one of the two light-sensitive elements by setting the bistable circuit to a predetermined one of its two stages irrespective of the signal applied to the information-signal input by the brightness-measuring circuit, so that the preliminary brightness level measurement will always be performed using the predetermined one of the two light-sensitive elements; and clocking means operative after completion of the preliminary brightness-measuring operation for applying a brief clock pulse to the clock input of the bistable circuit to briefly enable the gating means of the latter, thereby causing the signals appearing at the mutually complementary outputs to be dependent upon the signal applied to the information-signal input by the brightness-measuring circuit, whereby to switch the appropriate light-sensitive element into the light-integrating circuit and thereby ready the latter for the performance of an exposure control operation.

2. In a photographic camera as defined in claim 1, the bistable circuit being an RS master-slave flip-flop having in addition to the aforementioned information-signal input a second information-signal input, the brightness-measuring circuit comprising inverter means for applying to the second information-signal input the complement of the information-signal applied to the first information-signal input.

3. In a photographic camera as defined in claim 1, the brightness-measuring circuit comprising a comparator having an output connected to the information-signal input of the bistable circuit and having two inputs, a voltage-divider stage having a voltage-divider tap connected to one comparator input for applying a fixed voltage thereto, an indicator resistor connected to the predetermined one of the light-sensitive elements and forming therewith a voltage divider whose tap is connected to the other comparator input and establishing the scene brightness level constituting the upper limit of one brightness range and the lower limit of the other.

4. In a photographic camera as defined in claim 1, the camera including a battery, the bistable circuit having internal positive and negative operating voltage lines one of which is connected to one terminal of the battery, further including a diode connecting the other operating voltage line to the other terminal of the battery and a storage capacitor connected across the two operating voltage lines.

5. In a photographic camera as defined in claim 1, the brightness-measuring circuit including both light-sensitive elements, the bistable circuit when in the predetermined state causing the predetermined light-sensitive element to be switched into the brightness-measuring circuit but when in its other state causing the other light-sensitive element to be switched into the brightness-measuring circuit, whereby if the clock pulse causes the bistable circuit to change from the predetermined state to its other state the resulting switching in of the other light-sensitive element into the brightness-measuring circuit can cause the latter to change the information signal being applied to the information-signal input of the bistable circuit, the brightness-measuring circuit further comprising time-delay means operative for delaying the application of information signals to the information-signal input of the bistable circuit by a time-delay interval sufficiently long to ensure that such change of the applied information signal cannot occur until after termination of the clock pulse.

6. In a photographic camera as defined in claim 5, the time-delay interval being longer than the duration of the clock pulse.

7. In a photographic camera as defined in claim 5, the setting means comprising means for setting the bistable circuit to the predetermined one of its states by applying thereto a setting signal whose duration exceeds the time-delay interval of the time-delay means of the brightness-measuring circuit.

* * * * *